H. ROWNTREE.
FLEXIBLE CAR.
APPLICATION FILED APR. 4, 1912.

1,168,335.

Patented Jan. 18, 1916.

Inventor
Harald Rowntree
By his Attorney
Samuel E. Darby

UNITED STATES PATENT OFFICE.

HAROLD ROWNTREE, OF CHICAGO, ILLINOIS, ASSIGNOR TO NATIONAL PNEUMATIC COMPANY, OF CHICAGO, ILLINOIS, A CORPORATION OF WEST VIRGINIA.

FLEXIBLE CAR.

1,168,335.     Specification of Letters Patent.     Patented Jan. 18, 1916.

Application filed April 4, 1912. Serial No. 688,386.

*To all whom it may concern:*

Be it known that I, HAROLD ROWNTREE, a citizen of the United States, residing at Chicago, county of Cook, State of Illinois, have made a certain new and useful Invention in Flexible Cars, of which the following is a specification.

This invention relates to street railway or other cars.

The object of the invention is to provide a construction of car which is simple and efficient, and in which the car is composed of independently movable sections or body portions which are relatively flexible with respect to each other, permitting relative movement therebetween.

The object of the invention is to provide a flexible car which may easily turn around sharply bending curves where an ordinary rigid single long car could not be used.

A further object of the invention is to increase the carrying capacity of cars without increasing the crew or number of attendants for operating the same.

A further object of the invention is to afford a car which is easy of access from the street and wherein the loading and unloading operations are facilitated.

A further object of the invention is to provide a flexible car of the nature and character referred to, wherein the seating capacity of the car is increased.

Other objects of the invention will appear more fully hereinafter.

The invention consists substantially in the construction, combination, location and relative arrangement of parts, all as will be more fully hereinafter set forth, as shown in the accompanying drawing, and finally pointed out in the appended claims.

Referring to the accompanying drawing, and to the various views and reference signs appearing thereon,—

Figure 2:
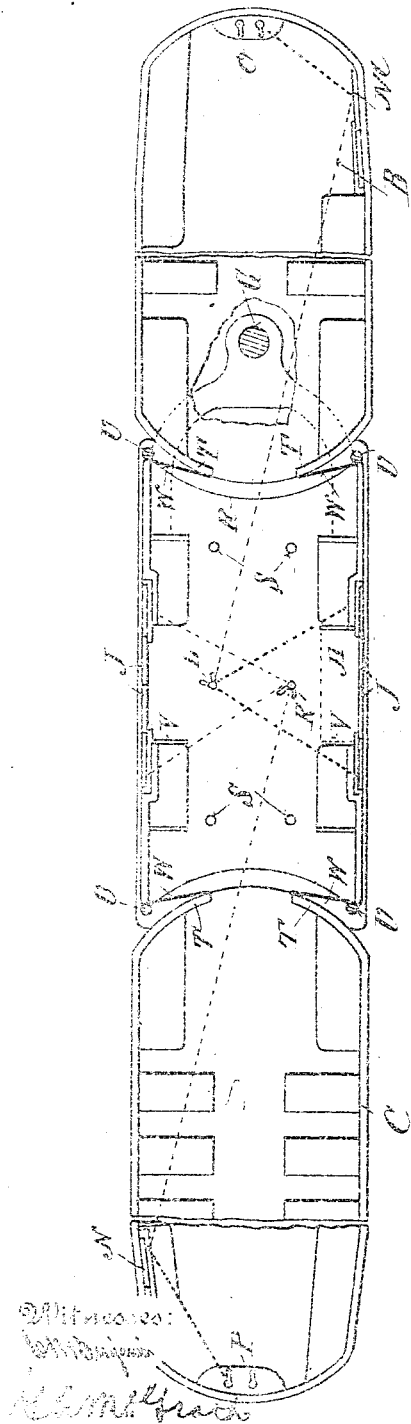
Figure 1:
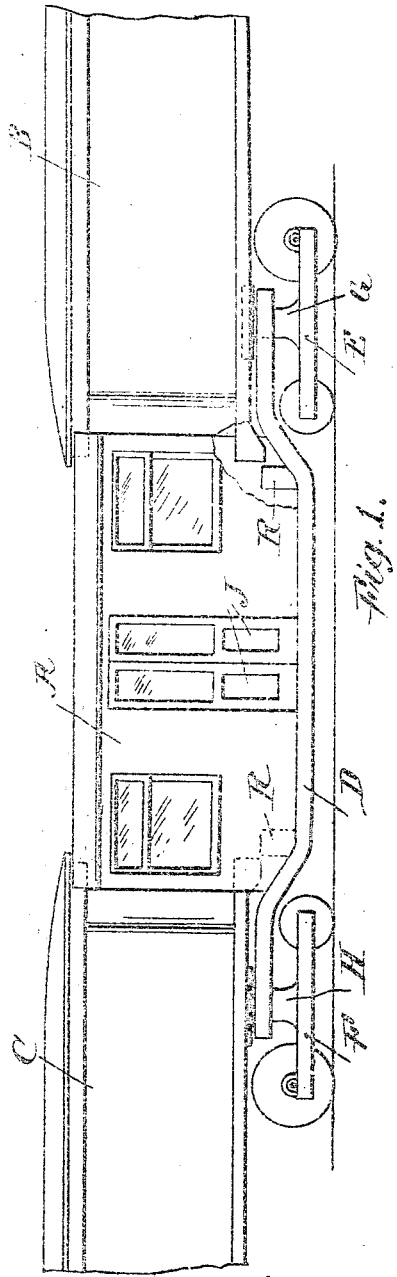

Figure 1 is a view in side elevation of a car embodying the principles of my invention. Fig. 2 is a somewhat diagrammatic view, in plan, parts broken out and in section, showing the arrangement embodying the principles of my invention.

In carrying out my invention, I propose to form the car in independent, relatively movable sections, the intermediate section being swiveled upon trucks of the front and rear sections. I also propose to form the intermediate section with a drop frame so as to bring the floor level thereof below that of the end portions or sections of the car, and into closer proximity to the ground or surface over which the car operates, thereby facilitating the entrance of passengers into the car and avoiding the necessity for employing steps for gaining access from the street level to the floor level of the car. In the sides of the intermediate section having the depressed floor level, I propose to locate the entrance doors to the car and to control from a convenient point inside such intermediate section the operation of the doors. I also propose to swivel the front end of the frame which carries the intermediate section upon a bolster or other suitable member of the rear truck of the front car, where the front section of the car is equipped with double trucks, or, if the front section of the car is equipped with only one truck, as in the case of single truck cars, for instance, then I propose to swivel the frame of the intermediate section at its front end upon the bolster or other convenient part of the single truck of the front car. Similarly I propose to swivel the rear end of the intermediate section, or the supporting under framing thereof, upon the truck of the rear section of the car, if only one truck is employed thereby, or upon the front truck of the rear section of the car in case of a double truck rear section. I also propose to locate the swivel axes of the connections between the front and rear ends, respectively, of the intermediate section and the trucks of the front and rear sections of the car, coaxially with the axis about which the front and rear sections swivel upon their trucks.

By such a construction as above indicated I am enabled to secure a flexibility of the car body which enables it efficiently to traverse very sharp curves, while at the same time increasing the carrying capacity of the car and the facility of entrance thereto and exit therefrom. I propose also to provide suitable steps or other means of access from the intermediate section to each of the front and rear sections of the car the said end sections of the car opening into the body of the intermediate section. In order to provide for the flexibility of the car and the relative vertical and lateral play or movement thereof, as in going up inclines, or in turning curves, I propose to locate one of the steps, if more than one is required, for access between the intermediate and the end sections, upon the intermediate section at each end thereof and the other upon the proximate end of the end section so that the one step will move relatively to the other. I also arrange the meeting surfaces of the steps upon a curve struck from an axis concentric with the swiveling axis of the car sections, as will be evident from the drawing.

Referring to the drawing, reference letter A, designates the intermediate section and B, C, the front and rear sections, respectively, of the car. The under framing D, of the intermediate section A, is dropped down so as to support the floor of the intermediate section at a level below that of the floors of the sections B, C, thereby bringing the floor of the intermediate section A, in closer proximity to the surface of the ground. The degree to which this intermediate section under framing or flooring may be dropped, may be sufficient to avoid the necessity for the employment of steps for access to and from the intermediate section A through its side doors. In this case the passengers entering or leaving the car through the doors in the sides of the intermediate section will step directly from the street surface into the car, or from the car onto the street surface.

In a flexible car of the type herein set forth where the sections are capable of relative movement not only laterally with respect to each other but also vertically, the vertical relative movements would make an inconvenient variation of floor levels of the intermediate and end sections of the car at their line of junction. It is also to avoid this objection that the floor level of the intermediate section is dropped below that of the end sections and a step arrangement is provided to step from the lower floor level of the intermediate section to the higher floor level of the end sections, any slight variations in the floor levels due to relative vertical movements of the sections being thereby practically unnoticeable to passengers using the steps.

Reference letters E, F, designate, respectively, trucks of the front and rear car sections B, C. Of course, it is obvious that the front and rear sections B, C, of the car may have only one truck, as in the case of single truck cars, or they may have double trucks, one at the front and one at the rear end of each of them. In the drawings, I have shown the latter arrangement, but I wish it understood that my invention is not to be limited or restricted in this respect. Carried by the trucks E, F, if they are single trucks, or, if double trucks are employed, then by the rear and front trucks respectively, of the sections B, C, is a pintle or standard indicated at G, H, forming pivotal supports to be engaged by the under framing D, of the intermediate section A, of the car so as to permit a relative swiveling or pivotal movement of the sections B, C, and A, relatively and with respect to each other. It will be observed that the intermediate section A, is unprovided with any supporting trucks, this section being swiveled and supported upon the trucks E, F, respectively, at the respective ends of said intermediate section.

The intermediate section A, of the car is provided with doors indicated at J, in the sides thereof. These doors may be of any suitable construction and arrangement and may be operated either manually or by power mechanism in any suitable or well known manner. In practice I prefer to employ means located within the intermediate section A, at the fare prepayment point for controlling the operation of the doors. I have indicated at K, L, the control and fare prepayment stations for the conductor where fares are collected from passengers as they enter the car, and from which point the doors are controlled.

If desired, the front end of section B, and the rear end of section C, of the car may also be provided with one or more side doors as indicated at M, N. These doors may be operated from any suitable or convenient point, and either manually or by power mechanism, as may be desired, and in the well known way. I have indicated by dotted lines, the control of the doors M, N, from the motorman's station as indicated at O, P, and also I have indicated by dotted lines the control of the doors M, N, at the ends of the sections B, C, from the conductor's station. It will be understood, of course, that these doors M, N, are to be employed only as exit doors. The passengers will enter through the doorways controlled by the doors J, in the usual and well known manner.

In the form shown, I employ a step indicated at R, carried by the intermediate section A, at each end thereof, and serving as means of access from the floor level of said intermediate section to the elevated floor level of the end sections B, C, of the car. It will be understood, of course, that the floor level of the end sections B, C, of the car is necessarily elevated or raised by reason of the fact that said sections are supported on and above the trucks E, F.

If desired, and for the convenience of passengers vertical rods or standards S, may be provided at convenient points in the intermediate section A.

From the foregoing description it will be seen that in turning curves there is a pivotal movement of the proximate ends of the sections A, B, and of the sections A and C. Such movement would ordinarily leave an open space at the point of junction of these sections. To prevent this I provide the sections B, C, at their junction with the intermediate section A, with inwardly turned side wall portions T, to form a doorway or passage through the ends of said sections which communicates with the interior of the intermediate section A, the steps R, being located at this point. If desired, and in order to still further protect against any undue opening between the proximate ends of the sections I propose to employ a flexible roll curtain W at each side of the entry way between the intermediate section A and the sections B and C. A convenient arrangement is shown wherein the curtains W, roll up on rollers V, which may be of the ordinary type and construction of spring curtain rollers, these being placed vertically at each side of each end of the intermediate section A, the free vertical edges of the curtains being secured to the edges of the entry way through the ends of the sections B, C.

It is obvious that any desired seating arrangement may be employed, and seats for passengers may be provided in each of the car sections and wherever permissible.

The door control devices L, K, are preferably located opposite the mid-width of the doors J, or the doorways controlled thereby, though it is obvious that they may be located at any convenient point. The control device L, is designed to control the doors in the right hand side of the section A, while the control device K, performs this function for the doors on the other side of the car. Where the doors on one side are in use those on the other side are maintained closed. In that case a hinged seat section indicated at V, may be employed across the closed doorway.

It is obvious that any suitable or well known form of truck may be employed and equipped with the usual driving motor, not shown, in the ordinary manner, controlled in the usual way from the motorman's station. I have shown a common form of truck employing the usual large and small wheels, but my invention is not to be limited or restricted in this respect.

Having now set forth the object and nature of my invention, and a construction embodying the principles thereof, what I claim as new and useful, and of my own invention and desire to secure by Letters Patent, is:—

1. Means for transporting passengers consisting of car end portions and trucks therefor, an intermediate car portion swivelly supported at its ends by said trucks, the flooring of the end portions being at a higher elevation than the flooring of the intermediate portion, and a communicating way between the end portions and the intermediate portion.

2. A car composed of end sections including supporting trucks, and an intermediate section, said intermediate section pivotally supported on said trucks.

3. A car composed of end sections including supporting trucks, and an intermediate section, said intermediate section being swivelly supported at its ends upon said trucks.

4. A car composed of end sections including supporting trucks, and an intermediate section, said intermediate section having a flooring at a lower level than that of the end sections, and swivelly supported at its ends upon said trucks.

5. A car composed of end sections including supporting trucks, and an intermediate section having hinged supporting connection at its ends with the trucks which support said end sections, the interiors of said sections communicating with each other, and a flexible curtain carried by the end of one of said sections and connected to the proximate end of another of said sections.

6. A car composed of end sections and an intermediate section, the floor of the intermediate section being at a lower level than that of the end sections, said intermediate section being hinged at its ends to the end sections and steps carried by the ends of the intermediate section, the opposed surfaces of the steps and the ends of the end sections being curved on the arc of a circle concentric with the axes of the hinged connections of the intermediate section.

In testimony whereof I have hereunto set my hand in the presence of the subscribing witnesses, on this 29th day of March, A. D. 1912.

HAROLD ROWNTREE.

Witnesses:
G. A. McGRATH,
S. E. DARBY.